US 6,559,873 B1

(12) United States Patent
Dawkins et al.

(10) Patent No.: US 6,559,873 B1
(45) Date of Patent: May 6, 2003

(54) DISPLAYING MENU CHOICES ADJACENT TO SPATIALLY ISOLATING REGIONS ENABLING DIFFERENT CURSOR MOVEMENT SPEEDS AND OTHER USER NOTIFICATION MEANS

(75) Inventors: Marilyn Diane Smith Dawkins, Austin, TX (US); Frank Eliot Levine, Austin, TX (US); Newton James Smith, Jr., Austin, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,583

(22) Filed: Dec. 17, 1999

(51) Int. Cl.$^7$ ................................. G09G 5/00
(52) U.S. Cl. ................ 345/862; 345/856; 345/859
(58) Field of Search .................. 345/859, 856–858, 345/860–862, 810, 821–824, 163, 160, 157, 159, 865

(56) References Cited

U.S. PATENT DOCUMENTS

| | | | |
|---|---|---|---|
| 4,755,808 A | | 7/1988 | Bullock et al. |
| 4,931,783 A | | 6/1990 | Atkinson |
| 5,508,717 A | | 4/1996 | Miller |
| 5,530,796 A | | 6/1996 | Wang |
| 5,565,888 A | * | 10/1996 | Selker .......................... 345/157 |
| 5,757,358 A | * | 5/1998 | Osga ........................... 345/157 |
| 5,760,776 A | | 6/1998 | McGurrin et al. |
| 5,784,583 A | | 7/1998 | Redpath |
| 5,805,165 A | * | 9/1998 | Thorne et al. ............... 345/823 |
| 5,808,601 A | | 9/1998 | Leah et al. |
| 5,963,191 A | * | 10/1999 | Jaaskelainen, Jr. .......... 345/856 |
| 5,986,639 A | * | 11/1999 | Ozawa et al. ................ 345/157 |
| 5,990,862 A | * | 11/1999 | Lewis .......................... 345/858 |
| 6,111,562 A | * | 8/2000 | Downs et al. ............... 345/727 |
| 6,295,049 B1 | * | 9/2001 | Minner ....................... 345/856 |
| 6,323,884 B1 | * | 11/2001 | Bird et al. ................... 345/810 |

OTHER PUBLICATIONS

Galitz (Essential Guide to User Interface Design, Wiley Computer Publishing, 1997, pp. 292–293).*
Netscape Browser, File Menu, Moving Cursor from Print . . . to Close.

* cited by examiner

Primary Examiner—Kristine Kincaid
Assistant Examiner—Sy D. Luu
(74) Attorney, Agent, or Firm—Arnold & Associates; Leslie Van Leeuwen

(57) ABSTRACT

A system, method, and program of the invention enables a separating region to be displayed adjacent to at least one side of a problem menu choice within a menu list in a user interface. The problem menu choice may be any menu choice that has the potential for causing undesirable effects if it is inadvertently selected by a user, such as by overshooting a desired menu choice with a displayed pointer. The separating region creates a non-selectable area that buffers the problem menu choices from the other menu choices. The user is notified if the user moves the displayed pointer into the separating region. The notification may include any one or more of the following: i) changing the rate of movement of the displayed pointer, ii) causing the displayed pointer to change in appearance, and iii) causing an audible sound. The separating region may be partitioned into zones wherein certain characteristics of the notification is dependent upon the zone location of the displayed pointer. In addition, the displayed pointer may change in appearance or a tone may sound at various frequencies, pitches or volumes dependent upon the location of the displayed pointer in the separating region or within one of its zones. In a further embodiment, the displayed pointer decreases its rate of movement as it passes through a separating region towards a problem menu choice, and increases its rate of movement as it enters into a selectable area of the problem menu choice.

18 Claims, 4 Drawing Sheets

DISPLAYING MENU CHOICES ADJACENT TO SPATIALLY ISOLATING REGIONS ENABLING DIFFERENT CURSOR MOVEMENT SPEEDS AND OTHER USER NOTIFICATION MEANS

CROSS REFERENCE TO RELATED APPLICATION

"A SYSTEM, METHOD, AND PROGRAM FOR PROVIDING A BARRIER AROUND A MENU CHOICE TO REDUCE THE CHANCE OF A USER ACCIDENTALLY MAKING A SELECTION ERROR", Ser. No. 09/465,585 having at least one common inventor, and commonly assigned, is hereby incorporated by reference.

BACKGROUND OF THE INVENTION

1. Field of the Invention

The field of invention relates to a method, system, and program means for reducing the chance of a user accidentally making a menu selection error, without causing the user extra effort in responding to a confirmation dialog; and, more specifically, to a menu layout in which some menu choices are spatially isolated from other selected menu choices; and to an enablement of the cursor to move at different speeds and other user notification means when the cursor approaches or travels through the region that isolates the menu choice.

2. Description of the Related Art

Considering that users rely on computers for a significant number of tasks performed every day, and that a variety of computers and computer software are used for these tasks; ease of use has become an important factor in a user's computer usage efficiency. For example, pointing devices and displayed menu items in a user interface increase the ease of use of computers and computer software and thus, increase a user's computer usage efficiency.

Although the use of a pointing device allows a user to navigate through an application and its interface with convenience and speed, the ease with which the displayed pointer can be moved often leads to errors when the user overshoots and clicks on the wrong menu choice. Menus often get constructed in a way that can lead a user into making serious errors. For example, an error might cause the user to inadvertently close a program. On the 'File' menu of a popular user interface, the 'Print' menu choice is directly above the 'Close' choice. If the user accidentally overshoots "Print" and clicks on 'Close' while attempting to print, the program terminates, and the program must be restarted. In addition, the user must repeat all of the steps in the program to get back to the point in the program prior to the occurrence of the error. These repeated steps can be burdensome and irritating to a user.

The user interface for Netscape has a visual line separating some menu choices from other menu choices. For example, under the "FILE" menu, there is a line between "Print" and "Close". There is also a visual line separating the "Go Offline" menu choice from the other surrounding menu choices. In addition, there is a line above and below the two "Save" menu choices which visually separate these menu choices from the surrounding menu choices. When the displayed cursor is moved within the menu option region, the region is highlighted. From the top side of the highlighted region to the bottom side of the highlighted region, it appears that the displayed cursor is enabled to be displayed and enabled to be incrementally moved for about 15 discrete pixel (picture element) positions. That is, the height of a menu choice region appears to be about 15 pixels. For most of the menu choices that are not separated by a line boundary, if a menu choice region is highlighted, i.e., selected, then a single discrete movement of the cursor away from the boundary of the highlighted region will cause the adjacent menu choice to the highlighted, i.e., selected. However, it appears that between the "Print" menu choice and the "Close" menu choice, which are separated by a visual line, the cursor can be moved away from the "Print" highlighted region such that "Print" is no longer highlighted, i.e., selected, without the adjacent "Close" menu choice being highlighted. It appears that the displayed cursor can be incrementally moved about 10 pixel positions towards the next menu choice before the next menu choice becomes highlighted, i.e., selected. Although the "Close" menu choice is separated visually by a line, and by a region of cursor movement that does not cause a menu selection, the separation is negligible in terms of preventing a user from overshooting a desired menu choice, e.g., "Print", and selecting another menu choice, e.g., "Close", in error.

A current solution to this problem is to provide a confirmation dialog which requires a user to confirm the selection of a choice that may produce a highly undesirable result. Confirmation dialogs require extra effort on the part of the user, and are typically found to be undesirable by users.

SUMMARY OF THE INVENTION

An apparatus, method, and program product are provided for reducing the chance of a user accidentally making a menu selection error while moving a displayed pointer through a list of menu choices without causing the user extra effort in confirming a menu choice. A separating region is displayed adjacent to certain menu choices which have a potential of causing undesirable results if erroneously selected by the user. Such a menu choice is referred to herein as a problem menu choice or problem menu option or problem menu selection. The displayed region is a non-selectable area. That is, even though it is visually associated with the problem menu choice, the problem menu choice is not enabled to be selected when the displayed cursor is within the region. As such, the region spatially isolates the problem menu choice from other menu choices.

In some preferred embodiments, the region surrounds the problem menu choice on all sides of the problem menu choice. In other embodiments, the separating region is displayed on just one or more of the sides of the problem menu choice, such as above the problem menu choice, or below it, or to one or more sides of it. The positioning of the separating region takes into consideration the direction that a displayed pointer is typically moved across the list of menu choices, and whether or not other menu choices are positioned above, below, or next to the problem menu choice. For example, a problem menu choice at the bottom of a list of menu choices may have a separating region above the problem menu choice, but not below the problem menu choice.

In addition to displaying a separating region adjacent to a problem menu choice, the preferred embodiments of the invention provide a method and means for notifying the user upon movement of the displayed pointer, i.e., cursor, into the separating region. As such, if the user did indeed overshoot a menu choice, any such notification serves also as a notification of an overshoot of a desired menu choice or selectable area. For different embodiments, the notification may include at least one of the following method or means:

i) causing the displayed pointer to have a change in its appearance, such as by causing it to blink or change colors; ii) causing an audio indication such as a beep or a tone as the displayed pointer moves into the separating region; and iii) causing a cursor, controlled by a pointing device, to have a change in its rate of movement, as it enters into a separating region, relative to the movement of the pointing device. In other embodiments, the rate of movement of the displayed pointer is dependent upon the distance the displayed pointer is from a selectable area of the problem menu choice, or dependent upon the positioning of the displayed pointer within zones that have been sectioned off within the separating region.

The foregoing and other objects, features and advantages of the invention will be apparent from the following more particular description of an example embodiment of the invention, as illustrated in the accompanying drawings, wherein like reference numbers represent like parts of the embodiment of the invention.

BRIEF DESCRIPTION OF THE DRAWINGS

For a more complete understanding of the present invention and the advantages thereof reference should be made to the following Detailed Description taken in connection with the accompanying drawings in which:

FIG. 4 is a diagram illustrating the method steps, program functions and apparatus means for partitioning regions into zones, determining a location of a displayed pointer relative to the zones, and controlling a speed of a displayed pointer as a function of the zone that the displayed pointer is in;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
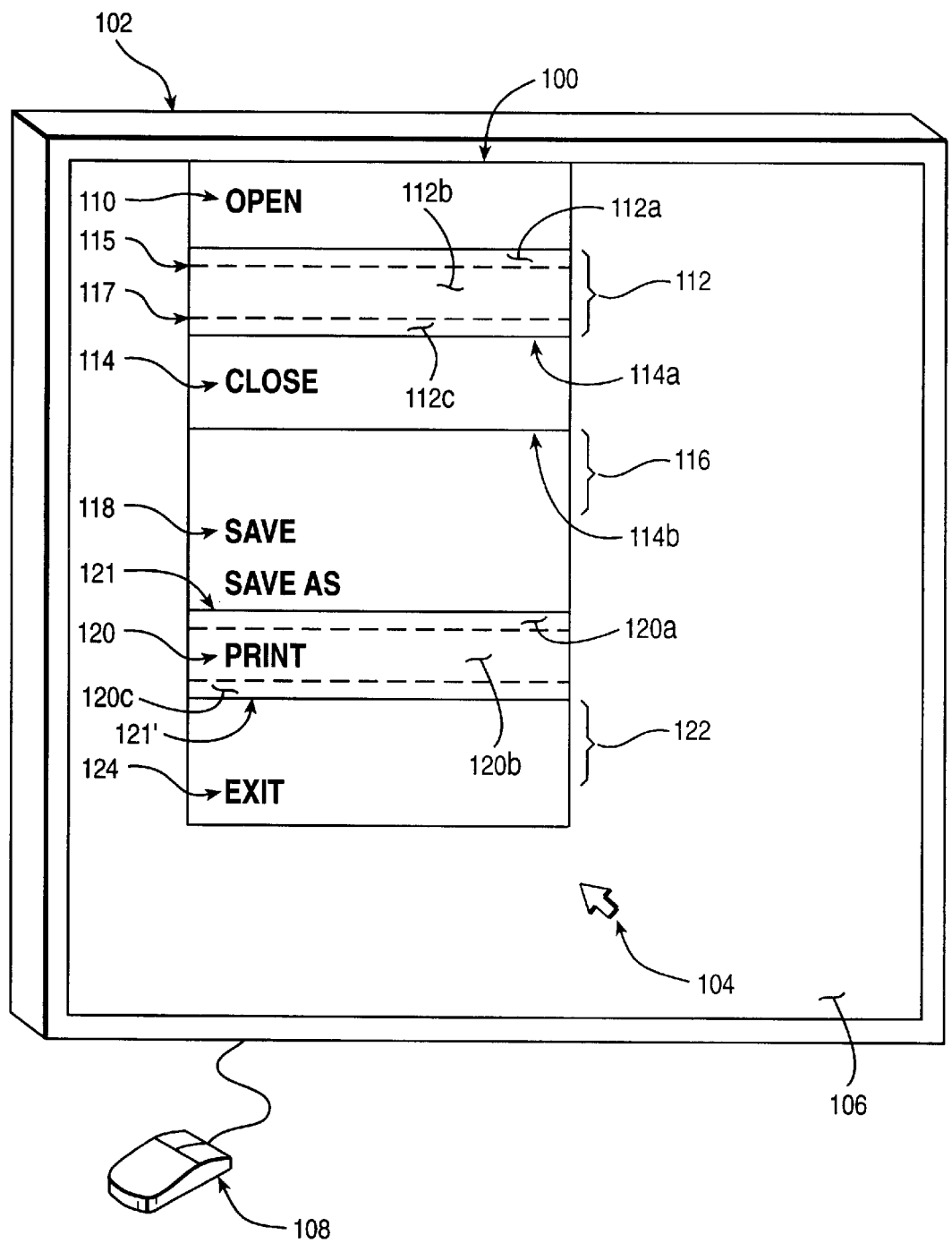
FIG. 1 shows a displayed menu list having spatially isolated menu choices.

Referring to FIG. 1, a computer 102 is seen having a display 106, a displayed pointer 104, and a pointing device 108. Also seen are menu choices 110, 114, 118, 120, and 124. As discussed above, a problem can arise when a user moves displayed pointer 104 over a menu choice that is not desired and accidentally selects it. For example, the user may desire to select menu choice 118 "Save", and accidentally select menu choice 114 "Close."

Figure 2:
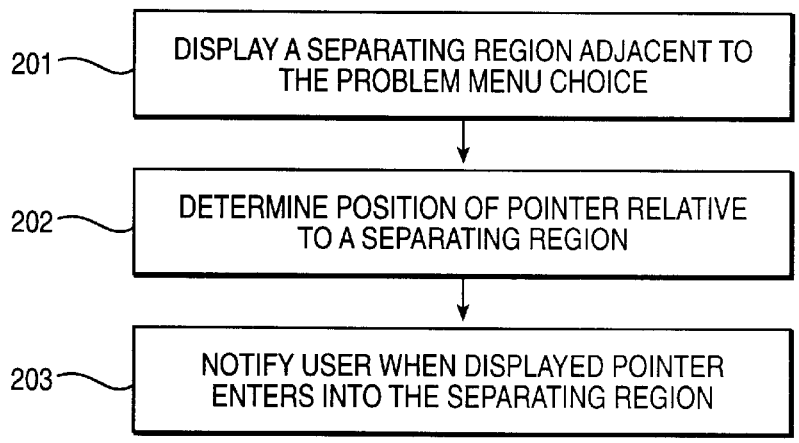
FIG. 2 is a diagram illustrating the method steps, program functions and apparatus means for displaying a separating region adjacent to a problem menu choice, for determining a position of a displayed pointer relative to the separating region, and for notifying a user when a displayed pointer enters into the separating region.

Process steps, program functions, and system means of preferred embodiments of the invention are shown in FIG. 2. First, a separating region is enabled to be displayed adjacent to the problem menu choice, 201. These separating regions are shown in FIG. 1 and labeled as 112, 116, and 122. The problem menu choices are "Close" 114, and "Exit" 124. For example, there is a displayed separating region between choices 114 and 118 at location 116, between choices 110 and 114 at location 112, and between menu choices 120 and 124 at location 122.

The separating region may be displayed above, or below, or to one or both sides, or to any one or more of these positions. If the problem menu choice is at the very bottom of a list of choices, the separating region may only be at the top of the problem menu choice. Likewise, if the problem menu choice is at the very top of a list of choices, the separating region may only be at the bottom of the menu choice. If there are other menu choices to one or both sides of the problem menu choice, then the separating region would be displayed at one or both sides in order to buffer the problem menu choice from adjacent menu choices. For example, as shown in FIG. 1, a separating region 112 and another separating region 116 are displayed on both top and bottom sides of a menu choice 114. The menu choice "Exit" 124, at the bottom of the menu 100, has only one separating region 122 displayed above the menu choice 124.

Figure 3:
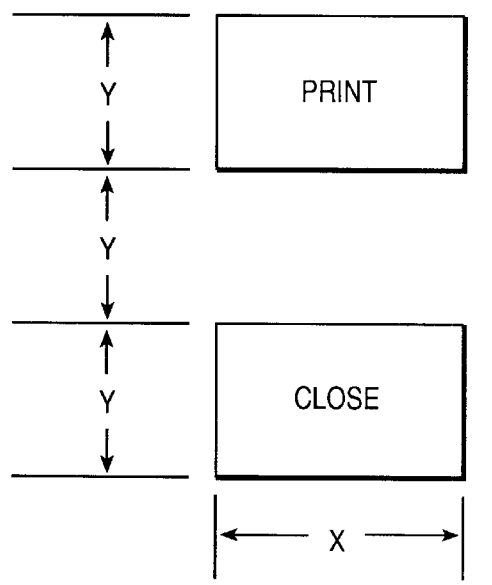
FIG. 3 illustrates the relative dimensions of the separating region of a preferred embodiment of the invention.

In a preferred embodiment, the separating region has at least the same dimension as the smallest dimension of the problem menu choice. For instance, if a problem menu choice is rectangular in shape having dimensions of 15 pixels by 45 pixels, then the region separating the problem menu choice from an adjacent menu choice should have at least one dimension that is at least 15 pixels. With reference to FIG. 3, if the height of the menu choices is "y", then the height of the separating region should also be at least "y". In the example above, "x" would be 45 pixel movements, and each "y" would be 15 pixel movements as measured by incrementally moving a display cursor.

In other preferred embodiments, especially those preferred embodiments further employing means for notifying the user when the displayed pointer enters into a separating region, the dimension of the separating region does not need to be at least the same dimension as the menu choice. Because of the additional feature(s), such as the change in cursor speed or other user notification means, the size of the separating region can be less than the size of a menu choice and still be effective in inhibiting a user from selecting, inadvertently, a problem menu choice.

As further shown in FIG. 2, there is a process step, means, and/or program function to determine a position of a displayed pointer relative to a displayed separating region, 202. If it is determined that a displayed pointer is at a boundary of a separating region, or within a separating region, the user is notified through the notification step, program function, and/or means 203. In a preferred embodiment, when the user "clicks on" or selects a separating region, no response is received, and the user sees the displayed pointer 104 in an incorrect location for selecting the desired choice 110, 114, 118, 120, or 124. In addition, the notification means include causing at least one of the following events to occur: i) a visual change such as the displayed pointer blinking or changing shape or size or color; ii) an audio indication such as a beep or a tone as the displayed pointer moves into the separating region; or iii) causing the displayed pointer to have a change in its rate of movement, as it enters into the separating region, relative to the movement of the pointing device. In other embodiments, the rate of movement of the displayed pointer is dependent upon the distance the displayed pointer is from a selectable area of the problem menu choice, or dependent upon the positioning of the displayed pointer within zones that have been partitioned off within the separating region.

As such, the method steps, program functions, and apparatus means, shown in FIG. 2, reduce the chance that a user will accidentally make an error by selecting a problem menu choice that is adjacent to the user's desired menu choice, without requiring the user to respond to a confirmation dialog if the problem menu choice is accidentally selected.

Preferred embodiments in which the speed of the displayed pointer is changed as it enters and moves through a separating region is further discussed. In one embodiment, the speed of the displayed pointer slows down relative to the physical movement of a pointing device. In another embodiment, the speed of the displayed pointer increases as the displayed pointer moves through a separating region and through a problem menu choice.

For example, if it is determined that the location of the displayed pointer is within a separating region or on its boundary, the displayed pointer slows down as it is moved through the separating region. The slowing of the displayed pointer indicates to the user that the displayed pointer is moving towards a problem menu choice, and that the user may have overshot a previous menu choice. More specifically, the slowing of the displayed pointer through a non-selectable separating region gives the user time to notice the location and direction of the displayed pointer and to assess whether or not the user has overshot a previous menu choice.

In yet other embodiments, as further shown in FIG. 1, a separating region 112 is partitioned into zones 112a, 112b, 112c. The partitioning lines 115, 117 are not necessarily displayed to a user, but are shown here for illustrative purposes only. The method, means and/or program functions further determine the location of the displayed pointer relative to a specific zone within a separating region. The speed of the displayed pointer relative to a movement rate of the pointing device is dependent upon which zone the displayed pointer is in. Each zone 112a–112c allows a selectable pointer movement rate as a function of the zone 112a–112c. In still other embodiments, each zone 112a–112c allows a selectable pointer movement rate as a function of distance from a boundary area 115 and 117 within the zone. In still other alternative embodiments, each zone 112a–112c allows a selectable pointer movement rate as a function of distance from the boundary 114a and 114b of a selectable area 114, such as an adjacent problem menu choice, e.g., "Close" 114.

In a preferred embodiment, the displayed pointer returns to its normal or original speed when the displayed pointer has passed through the separating region. In other embodiments, once the displayed pointer has slowed down and passed through a separating region, e.g., 122, adjacent to a problem menu choice, e.g., "Exit" 124, the displayed pointer may increase in speed as it moves within the selectable boundary of a problem menu choice. In this way, a user is required to use finer control over a pointing device in controlling a displayed pointer to be positioned over a selectable region of a menu choice, which requires more attention from the user in controlling the pointing device; thereby minimizing a chance of inadvertently selecting an undesirable menu choice. Increasing the speed of the displayed pointer through the problem menu choice makes it easier for the user to overshoot the problem menu choice. This makes it more difficult for the user to inadvertently select the problem menu choice. As such, the problem menu choice can only be easily selected if the user takes added care in controlling the pointing device through a slower movement and finer control of the pointing device when intentionally selecting the problem menu choice.

In still other embodiments, the zones described above are partitioned within a selectable area of a menu choice (for example, as seen in area 120 as zones 120a–120c). Zones 120a–120c allows variations in pointer speed dependent upon the distance from boundary 121 or 121' of the selectable area 120. As such, the speed of the displayed pointer can be varied with respect to the speed or movement of the pointing device in any menu choice, whether it is a problem menu choice or not. As discussed above, one embodiment has the displayed pointer increasing in speed through the problem menu choice. Likewise, in a further embodiment, the displayed pointer decreases in speed as it passes through other menu choices that are not deemed to be problem menu choices.

Figure 4:
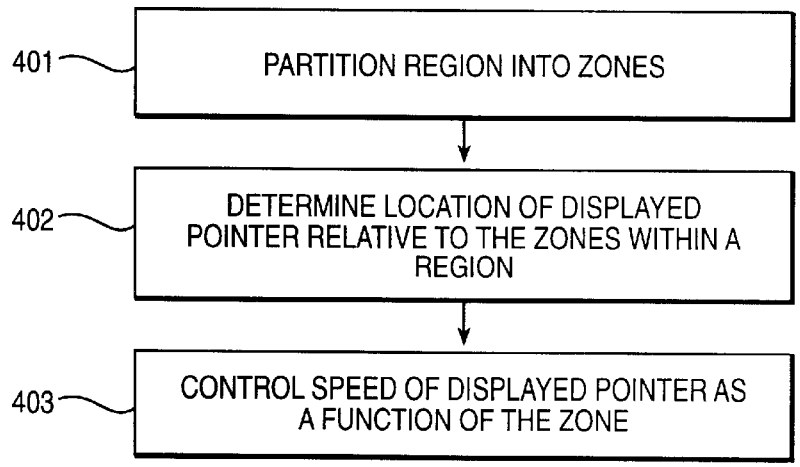

In the preferred embodiments discussed above, there are means for partitioning a displayed separating region (e.g. 112, 116, 122 of FIG. 1) into zones (e.g. 112a–112c). For example, partition separating region routine 401 of FIG. 4 determines the location of zones 112a–112c in separating region 112. Another routine or other means determines the location of the displayed pointer relative to the zones, 402. The speed of the displayed pointer is then controlled as a function of the zone and/or the location of the zone relative to other menu choices or boundaries or other zones 403. Each zone 112a–112c allows a selectable pointer movement rate as a function of the zone. For instance, some embodiments set the pointer movement rate to, decrease exponentially in zones close to the menu choices 114 and 124, and set the pointer movement rates to a flat rate in zones farther from the problem menu choices 114 and 124. In other embodiments the pointer movement rate is set to increase exponentially when the displayed pointer is within a problem menu choice and to return to a flat rate when the displayed pointer is within other menu choices. In alternative embodiments of the present invention, each zone allows a selectable pointer movement rate as a function of distance from an area within the zone or from an area outside of the zone.

The above embodiments have been described in terms of the changes in the rate of movement of the displayed pointer within a separating region, within zones within a given separating region, and through menu choices. Other embodiments are comprised of methods, means and program functions for sounding a tone as the displayed pointer enters into a separating region. The tone may increase or decrease in volume or pitch as it moves through a separating region or its zones. Likewise, other embodiments may use discrete tones (beeps) that increase or decrease in frequency as the displayed pointer moves through a separating region, through its zones, or through menu choices. In addition, other embodiments may use other notification methods, means, and program functions such as causing the displayed pointer to blink at various rates as the displayed pointer is moved through a separating region, its zones, or through menu choices. Enabling the displayed pointer to blink at various rates or frequencies, or enabling an audible tone at various volumes, pitches, or frequencies is carried out in a fashion similar to enabling the displayed pointer to move at different rates as more thoroughly described above.

The embodiments of the invention described herein can also include yet another feature to further inhibit a user from inadvertently selecting a problem menu choice. This further feature enables the problem menu choice to ignore a first "click" by a user. That is, if a user overshoots a desired menu choice, passes through the separating region, and still enters into the selectable area of the problem menu choice, the user must select, or click on, the problem menu choice two times. The first time will be ignored by the computer system. This feature can be used alone or in conjunction with any one or more of the notification means that may be used when the displayed pointer enters into the separating region. It is deemed to be particularly advantageous to use this feature in an embodiment in which an audible tone is produced to notify the user that the displayed pointer has entered into a separating region. Then, if the user overshoots the separating region, the chance that the user will inadvertently select the problem menu choice is reduced because the user's first click, or selection, is ignored.

The above features of the invention such as which menu choices are deemed to be problem menu choices, the size and location of the separating regions, the type of notification to be used, and the characteristics of the notification can be specified by a user of a program or the program's designer. Theses features can be "fixed" within the user interface of a software program, or they can be user selectable. More specifically, the features can be designed into any software program displaying a menu at the time the software program is created, or a user customization function can be provided, such as a user preference file, that allows a user to specify these features.

Figure 5:
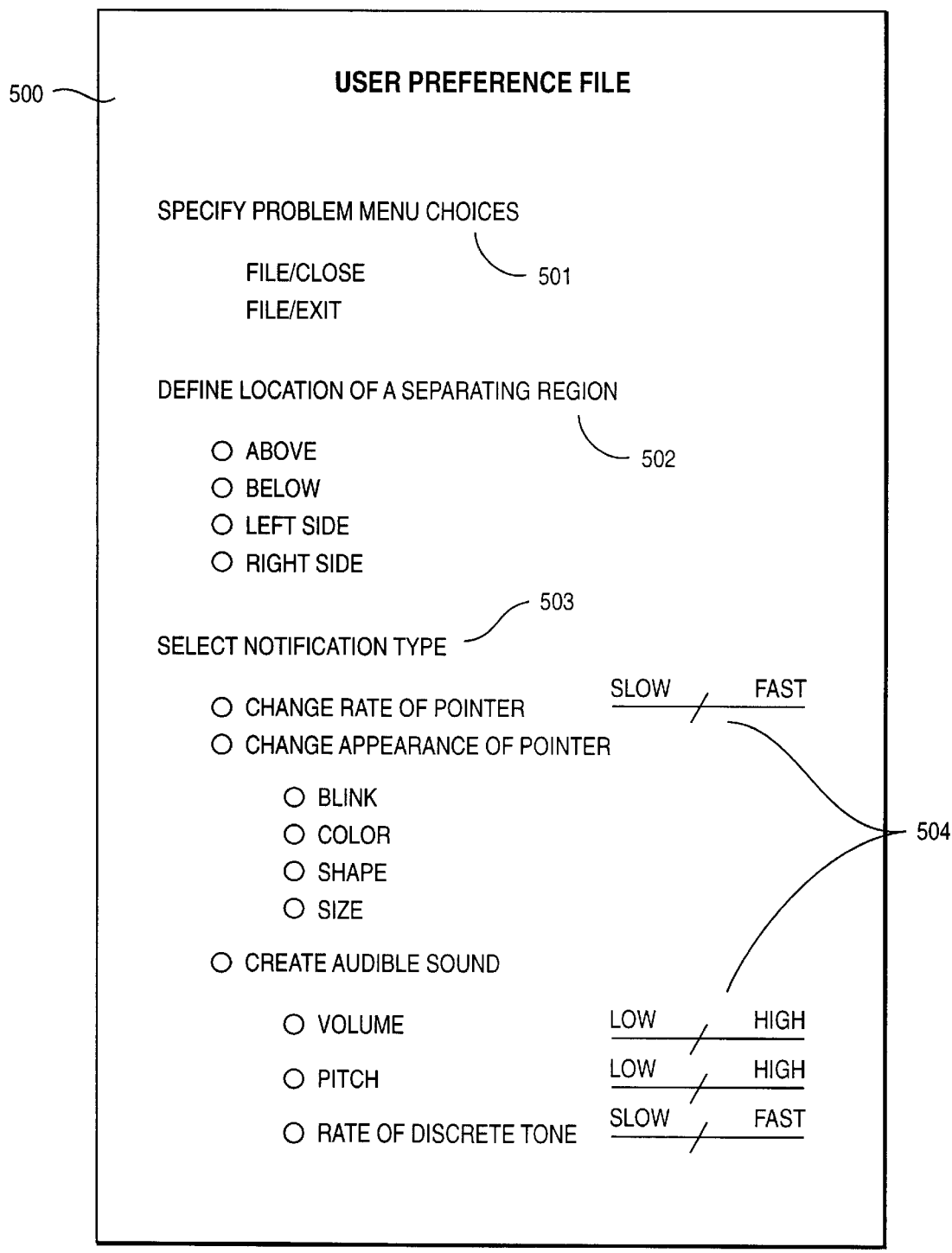
FIG. 5 shows a dialog for creating a user preference file designating a problem menu choice and its surrounding separating region.

FIG. 5 shows a dialog box 500 for creating a user preference file that allows a user to designate which menu choices are deemed by the user to be problem menu choices 501, and to separately designate the one or more sides where a separating region is to be displayed with respect to each one of the designated problem menu choices, 502. The dialog also allows the user to designate the type of notification 503, and any characteristics of the notification such as speeds or rates using a slider bar 504.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EEPROMs), recordable type mediums such as floppy disks, hard disk drives and CD-RW or DVD-RW disks, and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching.

Figure 6:
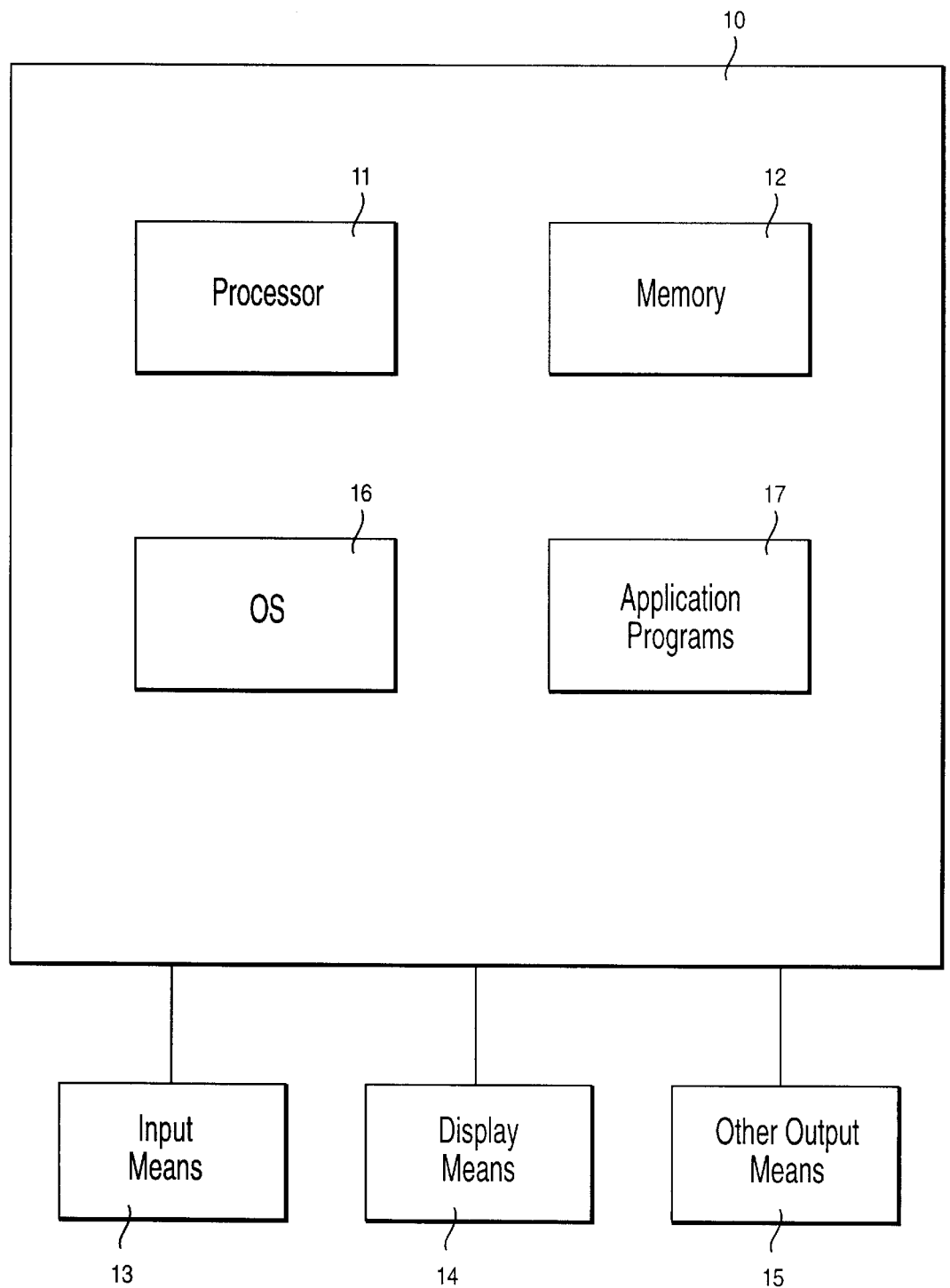
FIG. 6 is a computer system for carrying out the embodiments of the invention.

FIG. 6 depicts a block diagram of a typical computer system in which the described embodiments of the invention may be utilized. The computer includes at least one processor 11 and memory 12. The computer may be, but is not limited to, a personal computer, laptop, workstation, mainframe or hand held computer including palmtops, personal digital assistants, smart phones, cellular phones, etc. The computer system includes input means 13 such as keyboard, mouse, track ball, light pen, pen-stylus, voice input system, touch sensitive device, and/or any other input means. Also included are display means 14 and/or any other output device 15 including network communication devices. Memory 12 includes volatile or nonvolatile storage and/or any combination thereof. Volatile memory may be any suitable volatile memory device, e.g., RAM, DRAM, SRAM, etc; Nonvolatile memory may include storage space, e.g., via the use of hard disk drives, tapes, etc., for data, databases, and programs. The programs in memory include an operating system 16 and application programs 17.

The exemplary embodiment shown in FIG. 6 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A computer system having a display, a pointing device for moving a displayed pointer, and means for displaying a user interface menu to a user, the system comprising:
   means for receiving a definition of a separating region to be displayed from a user preference file;
   means for displaying the separating region adjacent to at least one side of a problem menu choice displayed on the display; and
   means for notifying the user upon a movement of the displayed pointer into the separating region.

2. The system of claim 1 wherein the user preference file identifies at least one problem menu choice and defines the location of the separating region in relation to the problem menu choice.

3. The system of claim 1 wherein the problem menu choice is a menu choice that has a potential of having undesirable effects if erroneously selected by the user.

4. The system of claim 1 wherein the means for notifying the user comprises at least one of the following: i) means for changing the rate of movement of the displayed pointer; ii) means for causing the displayed pointer to change in appearance, and iii) means for causing an audible sound.

5. The system of claim 4 further comprising means for partitioning the separating region into zones and causing the means for notifying to be dependent on the zones.

6. The computer system of claim 1 further comprising means for ignoring a first selection of the problem menu choice upon a movement of the displayed pointer into a selectable region of the problem menu choice after notifying the user.

7. A method for presenting a user interface menu to a user using a pointing device to move a displayed pointer on a display connected to a computer, the method comprising:
   receiving a definition of a separating region to be displayed from a user preference file;

displaying the separating region adjacent to at least one side of a problem menu choice displayed on the display; and notifying the user upon a movement of the displayed pointer into the separating region.

8. The method of claim 7 wherein the user preference file identifies at least one problem menu choice and defines the location of the separating region in relation to the problem menu choice.

9. The method of claim 7 wherein the problem menu choice is a menu choice that has a potential of having undesirable effects if erroneously selected by the user.

10. The method of claim 7 wherein the notifying the user comprises at least one of the following: i) changing the rate of movement of the displayed pointer, ii) causing the displayed pointer to change in appearance, and iii) causing an audible sound.

11. The method of claim 10 further comprising partitioning the separating region into zones and causing the notifying to be dependent upon the zones.

12. The computer system of claim 7 further comprising ignoring a first selection of the problem menu choice upon a movement of the displayed pointer into a selectable region of the problem menu choice after notifying the user.

13. A signal bearing medium enabled to be used in conjunction with a computer having a display, the medium comprising:

a designation of a definition of a separating region to be displayed from a user preference file;

a designation of at least one problem menu choice; and a designation of a notification to the user upon a movement of the displayed pointer into the separating region.

14. The medium of claim 13 wherein the user preference file identifies at least one problem menu choice and defines the location of the separating region in relation to the problem menu choice.

15. The medium of claim 13 wherein the problem menu choice is a menu choice that has a potential of having undesirable effects if erroneously selected by the user.

16. The medium of claim 13 wherein the designation of the notification to the user comprises at least one of the following: i) a designation of change in the rate of movement of the displayed pointer, ii) a designation of causing the displayed pointer to change in appearance, and iii) a designation of causing an audible sound.

17. The medium of claim 16 further comprising a designation of partition of the separating region into zones and a designation for causing the notification to be dependent upon the zones.

18. The medium of claim 13 further comprising a designation of ignoring a first selection of the problem menu choice upon a movement of the displayed pointer into a selectable region of the problem menu choice after the notification to the user.

* * * * *

UNITED STATES PATENT AND TRADEMARK OFFICE
CERTIFICATE OF CORRECTION

PATENT NO. : 6,559,873 B1
DATED : May 6, 2003
INVENTOR(S) : Dawkins et al.

It is certified that error appears in the above-identified patent and that said Letters Patent is hereby corrected as shown below:

Column 1,
Line 33, "these tasks;" should read -- these tasks, --.

Column 6,
Line 7, the word "allows" should read -- allow --.
Line 30, "to, decrease" should read -- to decrease --.

Signed and Sealed this

Fourteenth Day of October, 2003

JAMES E. ROGAN
*Director of the United States Patent and Trademark Office*